Jan. 4, 1944.  W. GEYGER  2,338,423
APPARATUS FOR MEASURING DIRECT CURRENTS OR VOLTAGES
Filed Dec. 14, 1939  2 Sheets-Sheet 1

INVENTOR.
Wilhelm Geyger
BY Richardson and Auer
Attys.

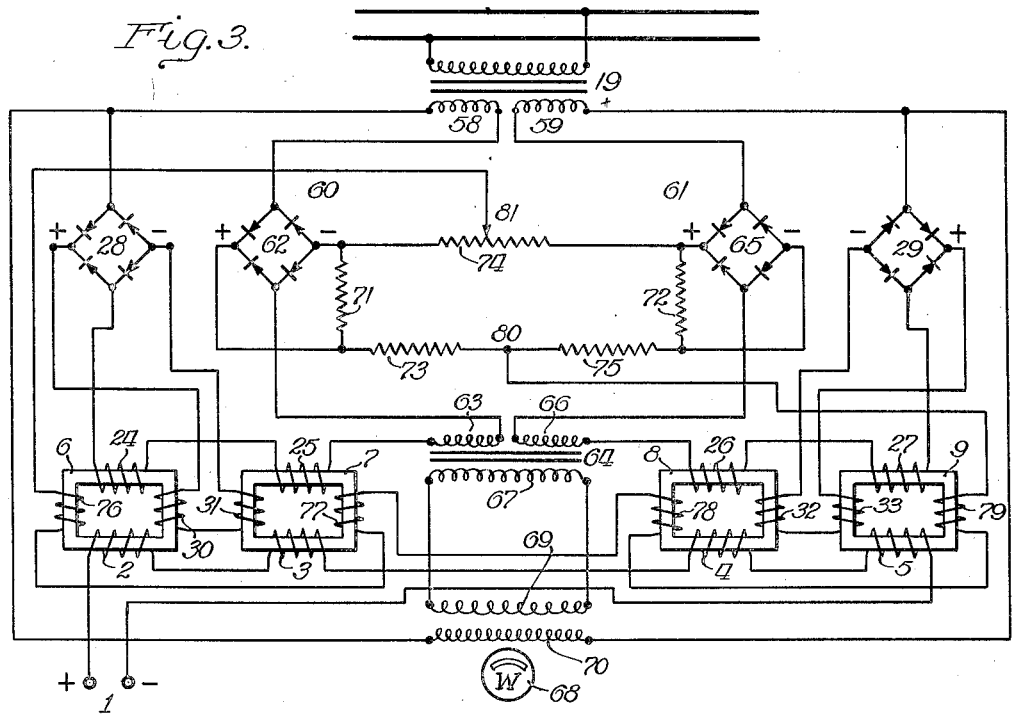

Patented Jan. 4, 1944

2,338,423

UNITED STATES PATENT OFFICE 2,338,423

APPARATUS FOR MEASURING DIRECT CURRENTS OR VOLTAGES

Wilhelm Geyger, Berlin-Schmargendorf, Germany; vested in the Alien Property Custodian Application December 14, 1939, Serial No. 309,226
In Germany December 14, 1938

8 Claims. (Cl. 171—95)

The present invention relates to an apparatus for measuring direct current voltage and more particularly weak currents or voltages. It is the principal object of the present invention to provide an apparatus or system for indicating or recording a relatively weak direct current or voltage by means of measuring instruments requiring relatively high current.

For attaining this object, the invention is based on the well known fact that the apparent resistance of ferro-magnetic inductances which are connected to a source of alternating current, is reduced by premagnetizing the same by means of a direct current derived from the direct current to be measured.

Another object of the invention is to produce an alternating current which is highly amplified in proportion to the direct current to be measured by means of a compensating circuit, and which may be used for controlling a reversible alternating current motor arranged in an alternating current differential circuit and provided for automatically balancing the compensating circuit.

A further object of the invention is to provide an apparatus operating without amplifier tubes for producing a highly amplified alternating current as compared with the measured value, whereby a continued supply of energy for heating the cathodes of such tubes and a replacement of worn-out tubes is avoided.

Another object of the invention is to provide an apparatus for measuring an alternating current supplied to the incoming terminals of a rectifier controlled in accordance with the phase of the current.

A further object of the invention is to provide an apparatus for measuring any other kind of value if the latter has been converted into a corresponding direct current value.

Still another object of the invention is to provide an apparatus of the type indicated which may be used for regulating or control purposes and in which the measuring instrument which responds to an increased extent to the direct current value, constitutes the regulating or control device.

Further objects, features and advantages of the invention will appear from the following description and the drawings, in which Fig. 1 illustrates diagrammatically an arrangement for measuring a direct current by means of a direct current compensating circuit in which the compensation is obtained automatically by an alternating current motor of the type similar to that used in an electric meter.

Fig. 3 illustrates an arrangement for measuring a very small direct current by means of an alternating current measuring instrument connected to a differential transformer, whereby the sensitivity of the instrument to respond to the current is increased many times by an additional double direct current magnetization of the iron cores of the choke coils.

Figure 1:
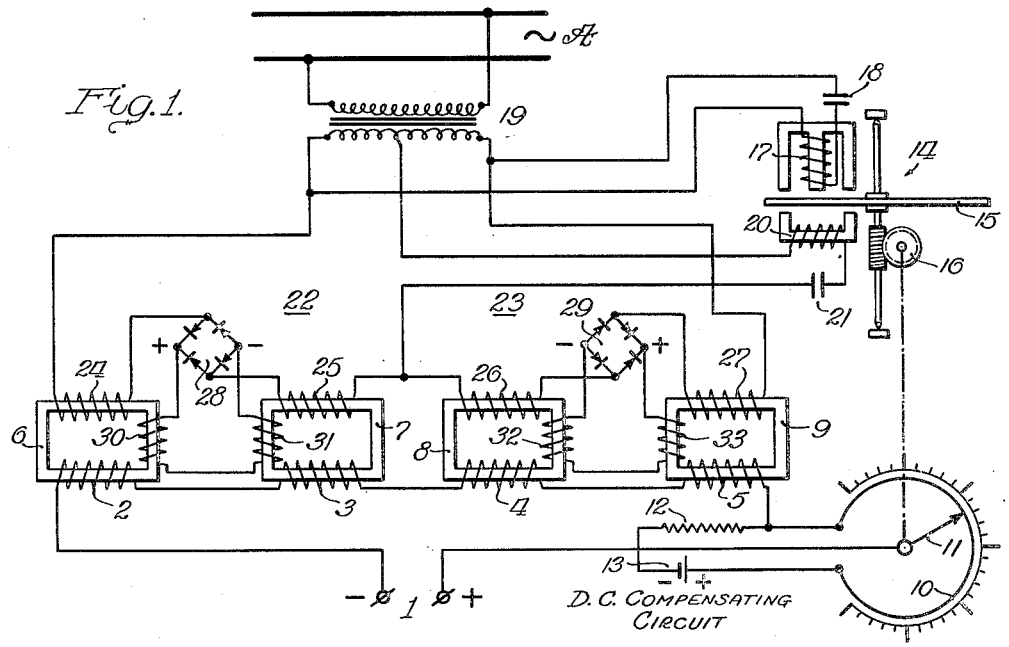

Fig. 4 shows a circuit similar to Fig. 1 in which the amount of the alternating current supplied to the measuring instrument and corresponding to the zero value of the direct current to be measured is considerably reduced by the use of condensers. The source of alternating current used for this purpose is formed by a direct current to alternating current converter which is supplied by direct current mains.

Referring to the drawings, Fig. 1 shows a transformer 19 the primary winding of which is connected to alternating current mains A, whereas the secondary winding thereof is divided into two equal parts. The current of the secondary winding of the transformer 19 is supplied on the one hand through a condenser 18 to the voltage coil 17 of an alternating current motor 14 of a type similar to that used in an electric meter, and, on the other hand, to the exciting coils 24, 25, 26, 27 of four iron cores 6, 7, 8, 9, respectively. As shown in Fig. 1, the exciting coils 24, 25, 26, 27 are connected in series and wound in the same direction. A rectifier 28 is connected between the coils 24 and 25 and a rectifier 29 between the coils 26 and 27. The central point of the secondary winding of the transformer 19 is connected through the current coil 20 of the motor 14 and a condenser 21 to the junction of coils 25 and 26, whereby an alternating current differential system is obtained including the two circuits 22 and 23. The outgoing terminals of the rectifier 28 are connected to two auxiliary windings 30 and 31 which are connected in series and wound in opposite direction on the iron cores 6 and 7. The outgoing terminals of the rectifier 29 are connected in a similar manner to two auxiliary windings 32 and 33 which are connected in series and wound in opposite direction on the iron cores 8 and 9.

The four iron cores 6, 7, 8 and 9 are also provided with control windings 2, 3, 4 and 5 one pair of which is connected in series with the other pair and wound in opposite direction thereto.

These control windings 2 to 5 are connected to terminals 1 through a portion of a slide wire 10 regulated by a rotatable contact arm 11. The slide wire 10 is connected through a fixed resistance 12 to a source of direct current 13. The contact arm 11 is in mechanical engagement with the armature disc 15 of the motor 14 through a worm gear 16.

If a small direct voltage is placed on the terminals 1, this voltage will be compensated at a certain position of the contact arm 11 by the compensating voltage received from the source of direct current 13, so that the windings 2 to 5 receive no current. Thus, the iron cores 6 to 9 are energized only by the alternating current windings 24 to 27 and the auxiliary windings 30 to 33. Because of the symmetrical arrangement of the system, the alternating current circuits are then, however, so balanced relative to each other that the currents in the differential branch containing the current coil 20 neutralize each other. Therefore, the meter disc 15 is at first not affected by any rotary moment. If, however, the voltage on the terminals 1 changes, the state of balance in the direct current compensating circuit is disturbed. A direct current now flows through the windings 2 to 5, and either reduces the resistance of the circuit 22 and increases the resistance of the circuit 23 or increases the resistance of the circuit 22 and decreases the resistance of the circuit 23, depending on the direction of the current flow. The changes of the current in the circuits 22 and 23 thus obtained, which are in different directions, are further increased to a considerable extent in the directions once taken by acting also upon the windings 30 to 33 through the rectifiers 28 and 29. This procedure leads to an increased current flow in the common branch of the circuits 22 and 23 and therefore to a much higher rotary moment of the meter disc 15. The arrangement described, therefore, has the advantage of responding with high sensitivity and speed. Since the rotation of the meter disc 15 is directly transmitted to the contact arm 11 on the slide wire 10, a new state of balance of the voltage of the terminals 1 is thus quickly obtained. The distance which the contact arm 11 travels on the slide wire 10 is thus a measure of the small direct voltage to be indicated, so that the contact arm 11 may form a pointer for directly indicating the measured value on a suitable scale.

Figure 2:
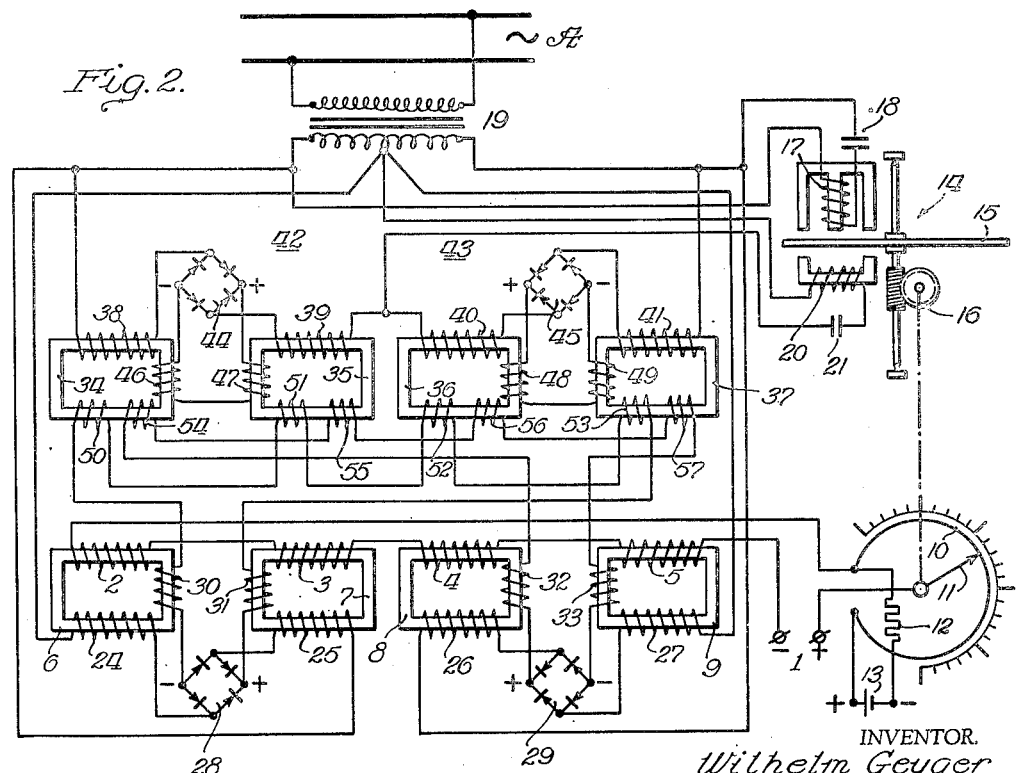
Fig. 2 shows an arrangement similar to Fig. 1 in which the alternating current used for operating the compensating motor, is produced by means of a two-stage amplifier circuit.

In Fig. 2, in which the elements corresponding to those shown in Fig. 1 are indicated by the same reference numerals, one half of the secondary winding of the transformer 19 is directly connected to the exciting windings 24 and 25 which are connected by a rectifier 28, and the other half of the secondary winding of the transformer 19 is connected to the exciting windings 26 and 27 which are connected by the rectifier 29. Aside from the four iron cores 6 to 9, a second amplifying stage is provided with four other iron cores 34 to 37 and exciting windings 38 to 41. A rectifier 44 is connected between the windings 38 and 39 and a rectifier 45 between the windings 40 and 41, and all of these windings 38 to 41 are connected to the secondary winding of the transformer 19 in the same manner as the windings 24 to 27 according to Fig. 1, so that two circuits 42 and 43 are formed and the current winding 20 of the motor 14 is provided in the differential branch. The rectifier 44 supplies auxiliary windings 46 and 47 on the cores 34 and 35, and the rectifier 45 the auxiliary windings 48 and 49 on the cores 36 and 37.

The outgoing terminals of the rectifier 28 not only supply the auxiliary windings 30 and 31 but in series therewith also the auxiliary windings 50 to 53 provided on the iron cores 34 to 37. The rectifier 29 supplies in a similar manner the auxiliary windings 32 and 33 in series with auxiliary windings 54 to 57 provided on the iron cores 34 to 37. The direction of current flow in windings 50 to 57 is such that the windings of each pair such as 50 and 54 are in opposition. The arrangement and connection of the control windings 2 to 5 in the compensating circuit and the arrangement of the slide wire 10 connected to the source of direct current 13, as well as the manner of coupling the contact arm 10 with the meter disc 15, are the same as that described above and shown in Fig. 1.

If a change in voltage on the terminals 1 causes a disturbance of the balance of the compensating circuit, the current flowing through the windings 2 to 5 causes opposite changes of resistance of the alternating current circuits including the windings 24 and 25 and 26 and 27, respectively. These changes in resistance are further increased in that the alternating currents, which are changed correspondingly, supply the direct currents for the windings 30, 31 and 32, 33. This mutual amplification of the difference between the currents flowing through the windings 24, 25 and 26, 27, respectively, and of the difference between the direct voltages supplied by the rectifiers 28 and 29, respectively, finally results in extremely great changes of resistance of the alternating current exciting circuits 42 and 43. These changes are produced by the windings 50 to 53 and 54 to 57, and are amplified due to the fact that the cores 34 to 37 are excited by direct current through the windings 46, 47, 48, and 49. The winding 20 of the motor 14 is, therefore, affected by a very high current value.

In the arrangement shown in Fig. 3, the transformer 19 is provided with two separate secondary windings 58 and 59 for supplying two alternating current circuits 60 and 61, respectively. The circuit 60 contains two rectifiers 62 and 28, the exciting coils 24 and 25 on the iron cores 6 and 7, respectively, and one of the two primary winding 63 of the differential transformer 64, all of these elements being connected in series with one another. The circuit 61 contains in a similar manner two rectifiers 65 and 29, the exciting coils 26 and 27 on the iron cores 8 and 9, respectively, and the second primary winding 66 of the differential transformer 64. The secondary winding 67 of this transformer is connected to the current coil 69 of an alternating current measuring instrument 68. The voltage coil 70 of this instrument is connected to the outer poles of the secondary windings 58 and 59 of the transformer 19. The direct current circuits of the rectifiers 28 and 29 are connected through the auxiliary windings 30 and 31 and 32 and 33, respectively, of the cores 6 and 7 and 8 and 9, respectively.

It may again be assumed that the value to be measured is a direct current voltage connected to the terminals 1 and supplying the control windings 2 to 5 of the iron cores 6 to 9, which are connected in series with one another. The direct current circuits of rectifiers 62 and 65 are closed by resistances 71 and 72, respectively, which are connected to a differential circuit for further magnetizing the cores of the chokes. For this purpose, the two rectifiers 62 and 65 are connected with each other with the polarity indicated in Fig. 3 through resistances 73, 74 and 75. The cores 2 to 5 carry additional windings 76 to 79 which are connected to the points 80 and 81 having the polarity indicated in the drawings, the point 81 being a sliding contact on the resistance 74 and the point 80 being a stationary point at the junction of resistances 73 and 75. The particular form of the windings, cores and connections of the chokes in the alternating current circuits 60 and 61 as shown in the drawings, prevents the alternating voltages supplied by the alternating current windings from acting upon the windings 30 to 33, 2 to 5, and 76 to 79. As clearly shown in the drawings, the two portions of the system on either side of a central line passing through the winding 67 of the differential transformer 64, are fully symmetrical.

If no voltage is supplied to the terminals 1, no current flows through the control windings 2 to 5. Owing to the symmetry of the differential circuit, the alternating currents flowing through the exciting coils 24 and 25 are equal to those flowing through the coils 26 and 27 so that no current flows through the secondary winding 67 of the differential transformer 64 and the measuring coil 69 of the measuring instrument 68. At this time, the cores 6 to 9 are magnetized by direct currents supplied by the rectifiers 28 and 29, respectively, and flowing through the windings 30, 31 and 32, 33, respectively.

If the differential circuit is balanced, alternating currents of the same value also flow through the rectifiers 62 and 65 so that the latter also produce direct current of the same value. Currents of equal value are then supplied by the equal resistances 71 and 72 to the resistances 73 to 75. The slide contact 81 may then be adjusted so that the voltage acting upon the windings 76 to 79 connected to the points 80 and 81 is equal to zero.

If, however, a small direct current voltage is supplied to the terminals 1, the resistances of the exciting coils 24 to 27 are changed because the cores are premagnetized by the direct currents flowing through the windings 2 to 5, so that depending upon the polarity of the voltage to be measured, the alternating current increases in one side of the differential circuit and decreases correspondingly in the other side thereof.

The current changes in the circuits 60 and 61 are then considerably increased in the directions once taken in that they are also permitted to act simultaneously through the rectifiers 62, 65, 28, and 29 upon the windings 76 to 79 and 30 to 33. This procedure finally causes a differential current to be produced in the secondary winding 67 of the differential transformer 64, said current being very high as compared to the incoming voltage. This differential current, which also flows through the measuring coil 69 of the instrument 68, also corresponds in phase to the direction of the direct current to be measured, the phase of the alternating current changing 180° when a change occurs in the direction of the direct current. If, for example, an electrodynamic or a rotating field measuring instrument is used, the size and direction of the indication thereof corresponds to an extremely increased extent to the size and direction of the direct current value to be measured.

In the embodiment of the invention shown in Fig. 4, the transformer 19 is provided, in a manner similar to the embodiment shown in Fig. 1, with a secondary winding having a central tapping and supplying the exciting windings 24 to 27 of the iron cores 6 to 9 through the rectifiers 28 and 29. The circuit of the rectifier 28 is closed by a resistance 82, a variable element of which is connected to the auxiliary windings 30 and 31 which are connected in series. The circuit of the rectifier 29 is closed in a similar manner by a resistance 83, and a variable element of this resistance is connected to the auxiliary windings 32 and 33 which are connected in series. The measuring coil 69 of the measuring instrument 68 is connected, on the one hand, to the middle of the secondary winding of the transformer 19 and, on the other hand, to the conductor connecting the exciting windings 25 and 26. A differential system is thus formed consisting of the circuits 98 and 99. The voltage coil 70 of the instrument 68 is connected to the secondary winding of the transformer 19.

A condenser 84 is connected in parallel with the exciting windings 24 and 25 which are connected in series, and a condenser 85 is connected in similar manner to the exciting windings 26 and 27. These condensers may be of such size that the open circuit current, that is, the current supplied by the source of alternating current to the measuring instrument, will be as small as possible if the premagnetization by the direct current value to be measured is missing. On the other hand, a higher open circuit current may be permitted and by providing the condensers the advantage is then obtained that the additional premagnetization may be stronger whereby a corresponding increase of the indicating sensitivity is obtained. By adjusting the slide contacts on the resistances 82 and 83, the most favorable relation between the sensitivity and the size of the open circuit current may be obtained.

In the arrangement shown in Fig. 4 it is further assumed that no alternating current mains but only direct current mains 86, 87 are available. A direct current to alternating current converter 88 is connected to the mains 86, 87 for supplying alternating current to the primary winding of the transformer 19. The converter consists of three contact strips 88', 89, and 95, which are connected by an insulating element 90. The contact strips 88' and 89 supply current to stationary contacts 91, 92 and 93, 94, respectively. The contacts 91 and 94 are connected with one another and to one side of the primary winding of the transformer 19, whereas the contacts 92 and 93 are likewise connected with one another and to the other side of the primary winding. The contact strip 95 carries an armature cooperating with an electromagnet 96 which is connected in a manner common with buzzer transformers through a further contact 97 to the direct current mains 86, 87. By oscillating the contact strips 88' and 89, an alternating current is produced in the primary winding of the transformer 19, so that an alternating current also flows in the secondary winding.

The operation of the embodiment shown in Fig. 4 is similar to that shown in Fig. 1. If a direct current voltage is applied to the terminals 1, the current flowing through the control windings 2 to 5 causes opposed changes of resistance in the alternating current windings 24, 25 and 26, 27, respectively. These changes in resistance are amplified in that the alternating currents which are changed correspondingly, and which are supplied from the outer terminals of the secondary winding of the transformer 19, furnish the auxiliary windings 30, 31 and 32, 33, respectively, with direct current voltages which are changed correspondingly. This mutual amplification of the currents flowing through the outer terminals of the secondary winding of the transformer 19 and the windings 30 to 33, finally results in an extremely great change in resistance in the alternating current circuits comprising the windings 24 to 27. The current coil 69 of the instrument 10 68 is therefore affected by an extremely amplified differential current.

I claim:

1. In an apparatus for measuring direct currents, a source of alternating current, a transformer having a primary winding supplied by said source and a secondary winding divided in two equal parts, four iron cores each carrying an alterating current exciting winding connected in series with said secondary winding, a control winding supplied by the direct current to be measured, and an auxiliary winding, a measuring instrument in the conductor connecting the central point of said secondary winding with the central point of the connection in series of the alternating current exciting windings of said four iron cores, and a rectifier in each of the alternating current circuits thus formed and supplied by said secondary winding, said rectifiers connected in series with said alternating current exciting windings and supplying current to said auxiliary windings of the respective iron cores.

2. In an apparatus for measuring direct currents, a source of alternating current, a differential circuit supplied by said source, four iron cores each carrying an exciting winding supplied by said source, a control winding on each of said cores supplied by the direct current to be measured, said control windings being so dimensioned and wound that the alternating voltages induced in said control windings by said alternating current exciting windings neutralize each other, and an auxiliary winding on each core, a rectifier in each of the two alternating current circuits of said differential circuit, said rectifiers being connected to said auxiliary windings of the respective iron cores in such a manner that the alternating voltages induced in said auxiliary windings by said alternating current exciting windings likewise neutralize each other, and a measuring instrument in the differential branch of said differential circuit.

3. In a direct current metering system, a balanced differential circuit comprising two side circuits and an output circuit in which the current is normally zero, means including a transformer for supplying alternating current to said differential circuit, two pairs of cores of magnetic material, exciting windings on said two pairs of cores connected in series in said two side circuits, respectively, a direct current circuit including control windings on said cores for unbalancing said differential circuit to produce a current in said output circuit, auxiliary windings on each pair of cores energized by current in the associated side circuit, means for rectifying the current in that portion of each side circuit which includes the said auxiliary windings, said auxiliary windings being so poled as to augment an unbalanced condition produced by said control windings, and means for measuring the current in said output circuit as a function of the current in the direct current circuit.

4. In a direct current metering system, a differential circuit arrangement comprising two side circuits and a third circuit common thereto carrying current dependent upon the difference between the currents in said side circuits, means for supplying alternating current to said side circuits, two pairs of cores of magnetic material two pairs of coil windings on said respective cores and supplied with current over said side circuits, respectively, a direct current circuit including four coil windings inductively related to the coil windings of said pairs and so wound that alternating current in the two windings of each pair alternately aids and opposes the direct current in the associated direct current windings, two rectifiers connected in series with the windings of said pairs, respectively, two coil windings supplied with direct current from one rectifier and connected in cumulative inductive relation to the two associated direct current coil windings, two coil windings supplied with direct current from the other rectifier and connected in opposing inductive relation to the two associated direct current windings, and means for measuring the current in said third circuit.

5. In a direct current metering system, two inductive windings having cores of ferro-magnetic material, a transformer having a primary winding for connection to a source of alternating current, a three wire circuit connecting the secondary winding of said transformer with said windings, said circuit including a neutral conductor connecting the junction of said windings with the center point of said secondary winding, a direct current circuit including other windings on said cores, said windings being so arranged that a flow of current in the direct current circuit will unbalance said three wire circuit and produce a current flow in the neutral conductor, rectifiers connected in series with said first mentioned windings, respectively, other windings on said cores supplied with direct current by said rectifiers, respectively, and arranged to amplify any unbalance produced in the three wire circuit by the direct current circuit, and means for measuring the current in the neutral conductor as a function of the current in said direct current circuit.

6. In a direct current metering system, a plurality of cores of magnetic material, a balanced differential circuit adapted to be supplied with alternating current and including a plurality of windings on the respective cores and including a neutral conductor carrying no current when said circuit is balanced, a direct current circuit having a plurality of windings in inductive relation to said first named windings for unbalancing said differential circuit, a compensating circuit including a source of direct current and arranged to oppose the flow of current in said direct current circuit, means for adjusting said compensating circuit in accordance with the value of the current in said direct current circuit, and means controlled over said neutral conductor in response to an unbalanced condition caused by current in the direct current circuit for actuating said adjusting means.

7. In a direct current metering system first and second circuits, means for supplying alternating current to said circuits, two iron cores each having a winding included in said first circuit, two iron cores each having a winding included in said second circuit, a direct current circuit including a control winding on each of said cores, an auxiliary winding on each of said cores, a differential circuit comprising two side circuits and a neutral conductor, two pairs of iron cores having windings in said side circuits, respectively, auxiliary windings on the cores of each pair energized by rectified current from the associated side circuit, auxiliary windings on the cores of said pairs connected in a series circuit with the auxiliary windings on the cores associated with said first circuit, means for supplying said series circuit with rectified current from said first circuit, auxiliary windings on the cores of said pairs connected in a second series circuit with the auxiliary windings on the cores associated with the second circuit, means for supplying said second series circuit with rectified current from the second circuit, and a measuring instrument controlled over said neutral conductor in accordance with the value of the current in said direct current circuit.

8. In a direct current metering system, two similar circuits, means for supplying alternating current to said circuits, two cores of magnetic material having windings included in the first circuit, two similar cores having windings included in the second circuit, a direct current circuit having a winding on each of said cores arranged to change the impedance of said circuits in opposite directions, auxiliary windings on the cores energized by rectified currents from the associated first and second circuits and arranged to amplify impedance changes produced by current in said direct current circuit, a differential circuit supplied with direct current from said first and second circuits by means of rectifiers, additional amplifying windings on said cores supplied with current over the neutral conductor of said differential circuit, a control circuit coupled in opposite senses to said first and second circuits, and a device controlled over said control circuit in accordance with the value of the current in said direct current circuit.

WILHELM GEYGER.